US007196136B2

(12) United States Patent
Soutar et al.

(10) Patent No.: US 7,196,136 B2
(45) Date of Patent: *Mar. 27, 2007

(54) UV CURABLE COATING COMPOSITION

(75) Inventors: Andrew McIntosh Soutar, Singapore (SG); Min Qian, Singapore (SG); Guangjin Li, San Diego, CA (US); Ivan Thomas Pereira, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 225 days.

This patent is subject to a terminal disclaimer.

(21) Appl. No.: 10/835,958

(22) Filed: Apr. 29, 2004

(65) Prior Publication Data

US 2005/0245633 A1 Nov. 3, 2005

(51) Int. Cl.
*C08K 3/36* (2006.01)
*C09D 133/04* (2006.01)
*C08J 3/28* (2006.01)

(52) U.S. Cl. ........................ 524/858; 524/866; 522/79; 522/80; 522/83

(58) Field of Classification Search ................ 524/858, 524/866; 522/79, 80, 30
See application file for complete search history.

(56) References Cited

U.S. PATENT DOCUMENTS 4,309,334 A * 1/1982 Valitsky ....................... 522/17
5,378,735 A * 1/1995 Hosokawa et al. ........... 522/79
5,426,131 A * 6/1995 Katsamberis ................ 522/16
5,449,702 A * 9/1995 Tayama et al. ................ 522/4
5,712,325 A * 1/1998 Lewis et al. .................. 522/83
5,910,372 A 6/1999 Griffin et al.
5,990,188 A * 11/1999 Patel et al. ................... 522/28
6,151,045 A 11/2000 Beach et al.
6,283,578 B1 9/2001 Popall et al.
6,306,502 B1 * 10/2001 Fukushima et al. ......... 428/412
6,325,490 B1 12/2001 Yang et al.
6,345,880 B1 2/2002 DeBoer et al.
6,825,239 B2 * 11/2004 Wilhelm et al. .............. 522/83
2002/0097297 A1 7/2002 Skinner et al.

FOREIGN PATENT DOCUMENTS

EP 0408047 A 1/1991
EP 0477555 A 4/1992
EP 0479493 A 4/1992
EP 0666290 A 8/1995
EP 0687713 A 12/1995
EP 0825025 A 2/1998
EP 1273448 1/2003

* cited by examiner

*Primary Examiner*—Susan Berman

(57) ABSTRACT

Disclosed is a UV curable coating composition comprising a (methyl)acryloxy or vinyl functionalized silane, silica and acrylate oligomer containing at least two acrylate groups.

16 Claims, 5 Drawing Sheets

UV CURABLE COATING COMPOSITION

The present invention relates to a UV curable coating composition, a method for coating a substrate with a curable coating composition, and a substrate comprising a layer obtained by curing of a UV curable composition.

BACKGROUND

In ink jet printing, images are produced from ink droplets ejected from nozzles in the print head and deposited on to a substrate. In order to accurately reproduce the image required, it is necessary to have close control over both the size of the ink droplets ejected and the direction in which they travel after detachment from the plate. Ink puddles near the ejecting nozzles in ink jet printing devices, both thermal and piezo driven, can adversely affect the trajectory of the ejected droplets, resulting in poor print quality. Interaction between the print head surface and the ink droplet has therefore to be closely controlled in order to maintain clean breakaway of the droplets. Generally speaking, to control the phenomena of ink puddling and to avoid the mixing of different inks, orifice plate surfaces with high hydrophobicity are preferred.

A range of different methods and materials has been employed by the industry to modify the surface properties of orifice plates, in order to obtain satisfactory print quality. The materials used depend, amongst other things, on the material of construction of the orifice plate and the type of printer it is being used on.

One possible solution to the problem is to apply a layer of fluorocarbon coating to the surface of the plate. However, though such materials provide excellent anti-wetting properties (which can be judged from a high contact angle water forms with the coated surface) they do pose other problems. It is generally difficult to get the fluorinated material to bind effectively to the plate surface, thus to ensure good adhesion of the layer, an intermediate coating layer is generally required. Such a two-layer process adds significantly to processing times and costs.

One such technology, described in U.S. Pat. No. 6,283,578 and U.S. Pat. No. 6,312,085, employs a siloxane polymer layer, formed from a mixture of silane precursors as the adhesion promoting layer onto which is deposited a monolayer coating of a perfluoroalkyltrialkoxysilane. However, the use of dual layer coating processes is time consuming and generally not cost efficient.

In U.S. Pat. No. 5,910,372 polysiloxane coatings are also employed. Several silane precursor types are mixed to give a single layer coating that combines the benefits of the two layer coatings described in U.S. Pat. No. 6,283,578. The coatings contain low levels of two different functional silanes, the bulk of the coating being composed of a non-functional silane. Amine functional silanes are included, which bind to the substrate and perfluoroalkyl silanes that migrate to the coating surface to give a low surface energy exterior. However, this technology has several limitations. It seems to be preferred for use on surfaces such as polyimide, to which the amines bind well. The coating process also involves several time consuming steps. After application, the coating is left to stand for five minute to allow phase separation of the different components in the coating to occur. Coatings are then cured for three hours at 95° C. under conditions of high humidity. The coatings show good resistance to ink, but are degraded by wiping which wears away the top surface in which the hydrophobic functionality is concentrated.

In addition, the use of different functional molecules with hydrophobic tails for monolayer coatings of print heads has also been proposed. The functional group of the respective molecule attaches to the plate surface of the print head, while the hydrophobic tail results in a low surface energy coating. Such monolayers of perfluoropolyether chain containing alkoxysilanes are claimed to be effective in EP patent application 1,273,448 A1. U.S. patent application 2002/0097297 A1 and U.S. Pat. No. 6,325,490 report monolayer coatings of alkyl thiols, while U.S. Pat. Nos. 6,151,045 and 6,345,880 describe the use of functionalised polydimethylsiloxane oligomers in such monolayers.

However, the practical application of such monolayers in ink jet printers may be problematic. Once ink accumulates on the orifice plate surface, the plate is wiped periodically with a wiper blade to clean the plate surface. Monolayer coatings as described above may not have sufficient durability to withstand this wiping action during a long life time that may thus result in damage to the coating and a change in the ink wetting properties of the surface. This in turn would lead to a decrease in print quality.

Accordingly, there remains the need for coating materials that adhere well to a surface of a print head, such as an orifice plate surface, and that is wear resistant so that it is not degraded by the wiping process used to clean ink from the orifice plate. The coating should also show high water contact angle and ink-contact angles that are not degraded by long-term exposure to ink.

SUMMARY

An aspect the invention provides a UV curable coating composition that includes a (meth)acryloxy or vinyl functionalized silane, silica and a polyurethane acrylate oligomer, wherein the polyurethane acrylate oligomer contains at least two acrylate groups.

Other aspects and advantages of the present invention will become apparent from the following detailed description, taken in conjunction with the accompanying drawings, illustrating by way of example the principles of the invention.

BRIEF DESCRIPTION OF THE DRAWINGS

The invention will be better understood with reference to the detailed description when considered in conjunction with the examples and the drawings, in which.

DETAILED DESCRIPTION

The coating composition in accordance with varying described embodiments is based on a (meth)acryloxy or vinyl functionalized silane (which will also be referred to as functionalised silane in the following) which after hydrolysis of the hydrolyzable groups of the silane and curing provides the basic matrix of the coating. In principle any suitable silane, alone or in combination with other silanes, can be used that has the formula (I)

$$X_aSiY_b,R^X_{(4-a-b)} \quad (I),$$

wherein in formula (I)

X denotes a hydrolysable group,

Y denotes a substituent that carries a vinyl, methacryloxy or acryloxy functionality;

$R^X$ is alkyl, aryl, alkenyl, alkylaryl or arylalkyl, a=1 to 3;

b=1 or 2. Examples of a hydrolysable group are halogen atoms such as chloro or bromo atoms or —OR groups, i.e. alkoxy groups, aryloxy groups, alkylaryloxy groups or arylalkyloxy groups. Examples of groups that can be used as substituent Y are vinyl groups, vinyloxyalkyl groups, acryloxyalkyl groups or methacryloxyalkyl groups.

One class of a particularly suitable (meth)acryloxy functionalized silane has the chemical formula (II), (II)

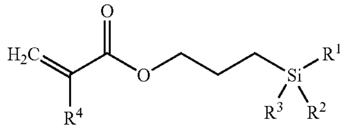

wherein in formula (II) $R^1$, $R^2$, and $R^3$ are independently from each other O-alkyl, O-aryl, O-arylalkyl, or halogen (Cl, Br, I, F) and $R^4$ is hydrogen or methyl. In this connection it is noted that alkyl and aryl groups in the functionalised silane usually have 1 to 20 carbon atoms. Alkyl groups can be straight chained or branched. Examples of alkyl groups are methyl, ethyl, propyl, isopropyl, butyl, isobutyl, tertiary butyl, pentyl, isopentyl, neopentyl, hexyl, heptyl, octyl, nonyl groups and the like. Examples of aryl groups are phenyl, naphthyl. Examples for arylalkyl groups are toluoyl or xylyl, while benzyl is an example of an alkyl aryl group.

One class of particularly suitable vinyl functionalized silane compounds has the chemical formula (III), (III)

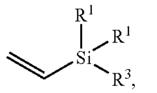

wherein in formula (III) $R^1$, $R^2$, and $R^3$ are independently from each other O-alkyl, O-aryl, O-arylalkyl, O-arylalkyl, or halogen (Cl, Br, I, F), wherein alkyl and aryl are defined above with respect to the compounds of formula (II). Examples of particularly suitable alkyl groups are methyl, ethyl, propyl, and isopropyl, whereas phenyl is an example of a particularly suitable aryl group that can be present in the compounds of formula (II).

Figure 1A:
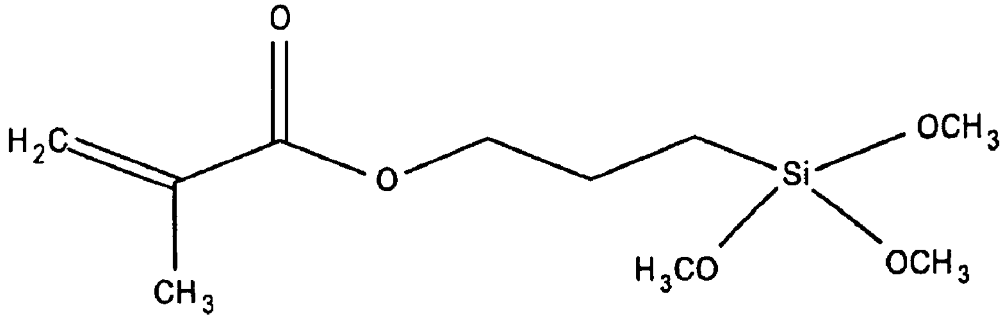
FIG. 1 shows 3-methacryloxypropyl trimethoxysilane (FIG. 1*a* and 3-acryloxypropyl trimethoxysilane (FIG. 1*b*), and vinyl triethoxysilane (FIG. 1*c*) as examples of suitable functionalized silanes that can be used in the coating composition in accordance with an embodiment of the invention.
Figure 1B:
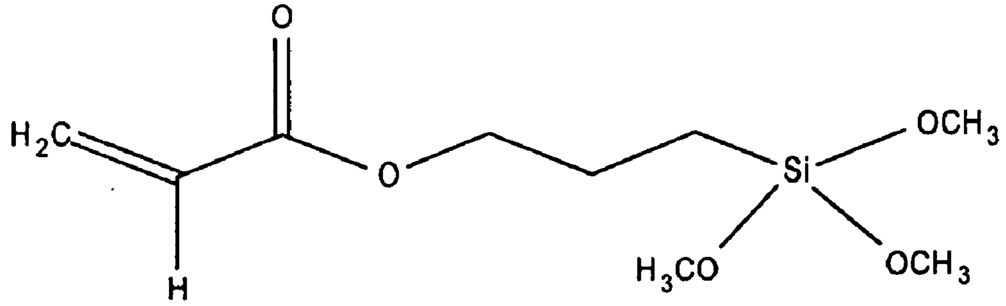
Figure 1C:
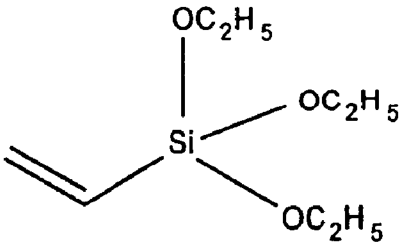

Examples of silane compounds that can be used in an embodiment of the coating composition are 3-methacryloxypropyl trimethoxysilane (cf. FIG. 1*a*), 3-acryloxypropyl trimethoxysilane (cf. FIG. 1*b*), 3-methacryloxypropyl triethoxysilane, 3-acryloxypropyl triethoxysilane, 3-methacryloxypropyl tritert-butyloxysilane, 3-acryloxypropyl tritert-butyloxysilane, 3-methacryloxypropyl dimethoxethoxysilane, 3-acryloxypropyl-dimethoxethoxysilane, 3-methacryloxypropyldiethoxmethoxysilane, 3-acryloxypropyldiethoxmethoxysilane, vinyl trimethoxysilane, vinyl triethoxysilane (cf. FIG. 1*c*) or vinyl tris(2-methoxyethoxy)silane.

As a second component the curable composition includes silica. Incorporation of silica into the curable composition allows the deposition of thicker coating layers that do not crack, i.e. that have a better mechanical strength. Any kind of silica particles (for example, fumed silica or colloidal silica) can be used, as long as these particles are compatible with the process of producing the curable composition and with deposition and curing on the selected substrate. The silica particles can have a size from 5 to about 200 or up to about 500 nanometres. Colloidal silica (Chemical Abstracts Number 7631-86-9) has found to be particularly useful and is commercially available from many suppliers. For example, it is sold under the trade name Snowtex® from Nissan Chemicals or under the trade name NYACOL® from Nyacol Nanotechnologies, Inc. The silica used may have any available particle size and form. Typically, the particles of the used silica have an average particle size or particle size distribution ranging from about 5 to about 100 nanometres. In one embodiment, the silica particles have a particle size in the range of from about 10 to about 20 nanometres.

The curable composition further includes a polyurethane acrylate oligomer. Addition of such an oligomer was found to improve the resistance of the cured coating to degradation by ink. The acrylate oligomer contains at least two acrylate groups (which are also referred to as functionalities). The acrylate oligomer may thus have any number of acrylate functionalities from two or more, as long as the acrylate oligomer is compatible with the other components of the coating composition and leads to a coating with acceptable chemical and mechanical properties. Typically, the acrylate oligomer has two to six acrylate functionalities, meaning that the acrylate oligomer contains, for example, two, three, four or six acrylate groups that can be cross-linked when curing the coating composition disclosed herein.

The acrylate oligomer can be any aliphatic or aromatic branched or straight chained urethane acrylate product. The polyurethane oligomer can be an individual oligomer of a defined molecular weight, or an oligomer having a molecular weight distribution. It can be made from a single building block or monomer for the isocyanate component (which can be tolylenediisocyanate or hexamethylendiisocyanate, for example) and the component having active hydroxyl groups (for instance 1,4 butyleneglycol, or a polyether based on 1,2-ethyleneglycol). A mixture of different building blocks for each of the isocyanate component and the component having hydroxyl group can also be present in the polyurethane acrylate oligomer. Mixtures of two or more chemically different polyurethane acrylate oligomers can also be used in an embodiment of the composition. The urethane acrylate oligomer can be chosen empirically such that chemical resistance, water resistance and heat resistance of the resulting coating are improved.

Useful urethane acrylate oligomers can include a polyester backbone, a polyether backbone or a combination thereof. Examples of such urethane acrylates that can be used are those oligomers from Sartomer Company, Inc, Exton Pa. that are available under the CN-Series or the Riacryl materials, for example, Sartomer CN 991, CN 980, CN981, CN962, CN 964, Sartomer CN973J85, or Sartomer Riacryl 3801 etc. For example, CN 981 and CN 980 are aliphatic linear ethers, with a weight average molecular weight of about 1600 to about 1800 and about 2400 to about 2600, respectively. CN 964 is a branched ester with a weight average molecular weight of 1600 to 1800. Other examples of suitable urethane acrylate oligomers are the linear polyether urethane (meth)acrylate oligomers of the BR-500 series or aliphatic (difunctional) polyester urethane acrylate oligomers of the BR-700 series, or the aromatic and aliphatic trifunctional polyether urethane (meth)acrylate oligomers of the BR-100 series all of which are available from Bomar Specialities Co., Winsted, Conn. The general class of urethane oligomers described in U.S. Pat. No. 5,578,693 can also be used in conjunction with an embodiment of the composition. Typically, the urethane acrylate oligomer has a weight average molecular weight in the range from about 1000 to about 6000 Dalton. Some urethane acrylate oligomers have a weight average molecular weight ranging from about 1100–1300 to about 5400–5600.

A further component of the curable composition is a solvent. In principle any solvent can be used as long as it is miscible with the other components but chemically inert. Examples of useful solvents include ethanol, isopropanol, ethyl methyl ketone (EMK) or high boiling point solvents such as ethylene glycol, propylene glycol, propylene glycol methyl ether, or propylene glycol ethyl ether.

In addition to the above-mentioned components, the curable composition optionally includes a hydrophobic agent to increase the hydrophobic properties of the layer, i.e. to increase the water and ink contact angles. Various additives can be usefully incorporated for this purpose. Useful additives include, for example, acrylated polydimethylsiloxane (PMDS), silane with at least one alkyl chain attached to the silicon atom, perfluoralkyl alkoxysilane, perfluorinated acrylate oligomers, perfluorinated acrylate monomers and combinations thereof.

A suitable acrylated polydimethylsiloxane that is used as hydrophobic agent includes a linear chain between about 10 and about 30, preferably about 20 dimethylsiloxane units with acrylate groups at either end. Such acrylated polydimethylsiloxane compounds are commercially available, for example, from Tego Chemie, Essen, Germany (Tegomer V-Si 2250), or from Wacker Chemie, Burghausen, Germany (Addid 320).

A silane with at least one alkyl chain attached to the silicon atom that is useful as hydrophobic agent can have the formula (IV)

$$RSiOR'OR''OR''' \quad (IV),$$

wherein in formula (IV) R is alkyl, alkylaryl, aryl, arylalkyl having 2 to 20 carbon atoms, and R', R'', and R''' are independently from each alkyl, alkylaryl, aryl, arylalkyl having 1 to 10 carbon atoms. Examples of such hydrophobic agents are dodecyltriethoxysilane, octyltrimethoxysilane, propyltrimethoxysilane, phenyl trimethoxysilane, to name a few.

A perfluoroalkyl alkoxysilane that can be used as hydrophobic agent in an embodiment of the curable composition has the formula (V)

$$CF_3(CF_2)_m(CH_2)_nSi(OR)_3 \quad (V),$$

wherein n is an integer between 1 and 4 and m is an integer between 1 and 12. R is an alkyl or aryl group as defined above for the compounds of formula (II) and can be same or different. This means, R can be any alkyl or aryl substituent $R^1$, $R^2$, and $R^3$ as defined above. An example of a useful fluorinated acrylate oligomer is Sartomer's CN4000.

The above-described components are usually present in the curable composition in the following weight ratios (which are expressed as weight percent relating to the total weight of the composition; % w/w):

(meth)acryloxy or vinyl functionalized silane: 25 to 50 wt.-%,
silica: 10 to 25 wt.-%,
urethane acrylate oligomer: 4 to 15 wt.-%
solvent: 20 to 40 wt.-%;
hydrophobic agent (additive): 4 to 20 wt.-%

In some embodiments, the content of the components in the composition is as follows:

(meth)acryloxy or vinyl functionalized silane: 30 to 42 wt.-%, or 35 to 38 wt.-%,
silica: 13 to 21 wt.-%, or 16 to 18 wt.-%,
urethane acrylate oligomer: 4 to 15 wt.-%
solvent: 25 to 37 wt.-%, or 28 to 32 wt.-%;
hydrophobic agent (additive): 5 to 18 wt.-% or 6 to 14 wt.-%

Furthermore, for the curing step an initiator compound (catalyst) that starts the crosslinking between any of the vinyl, acrylate and methacrylate groups within the coating is usually added to the composition. Since curing can be conveniently carried out by exposure to UV light, photoinitators that create free radicals upon irradiation with light of respective wavelength are a presently preferred group of catalysts. Examples of suitable photoinitators include the compounds manufactured by Ciba, Switzerland under the trade names Darocur® and Irgacure®. Such initiator compounds are usually added to the composition in small amounts, for example, 0.1 to 5 wt. % related to the total weight of the composition.

It is also possible to add to a coating in accordance with an embodiment, an adhesion improving agent. Such an agent can be a mercapto functionalized alkoxysilane, an epoxy functionalized alkoxysilane or combinations thereof. Examples of suitable mercapto functionalized alkoxysilanes are 3-mercaptopropyl trimethoxysilane or 3-mercaptooctyl trimethoxysilane. Examples of epoxy functionalized alkoxysilane are 3-glycidoxypropyl trimethoxysilane, 3-glycidoxypropyl trimethoxysilane, 3-glycidoxypropyl methyltrimethoxysilane and 3-glycidoxypropyl methyltriethoxysilane. If desired, these adhesion improving agents can be present in the composition in the range of about 0.5 to about 15 wt. % related to the total weight of the composition. Higher levels of up to 15 wt.-% are used when epoxy functional materials such as 3-glycidoxypropyl trimethoxysilane are employed, whereas smaller amounts in the above range are sufficient when mercapto functionalized alkoxysilanes are employed.

The composition can further include auxiliary agents which provide for a faster curing and/or an improved cross-linking of the vinyl and (meth)acrylate groups within the coating. Examples of such auxiliary agents are monomeric compounds having two or more acrylate functionalities such as 1,4-butanediol dimethacrylate, trimethylolpropane triacrylate, pentaerythritol triacrylate, or ditrimethylolpropane tetracrylate. If added, these auxiliary reagents are generally present in small amounts, typically 0.1 to 10 wt. % related to the total weight of the composition.

Figure 2:
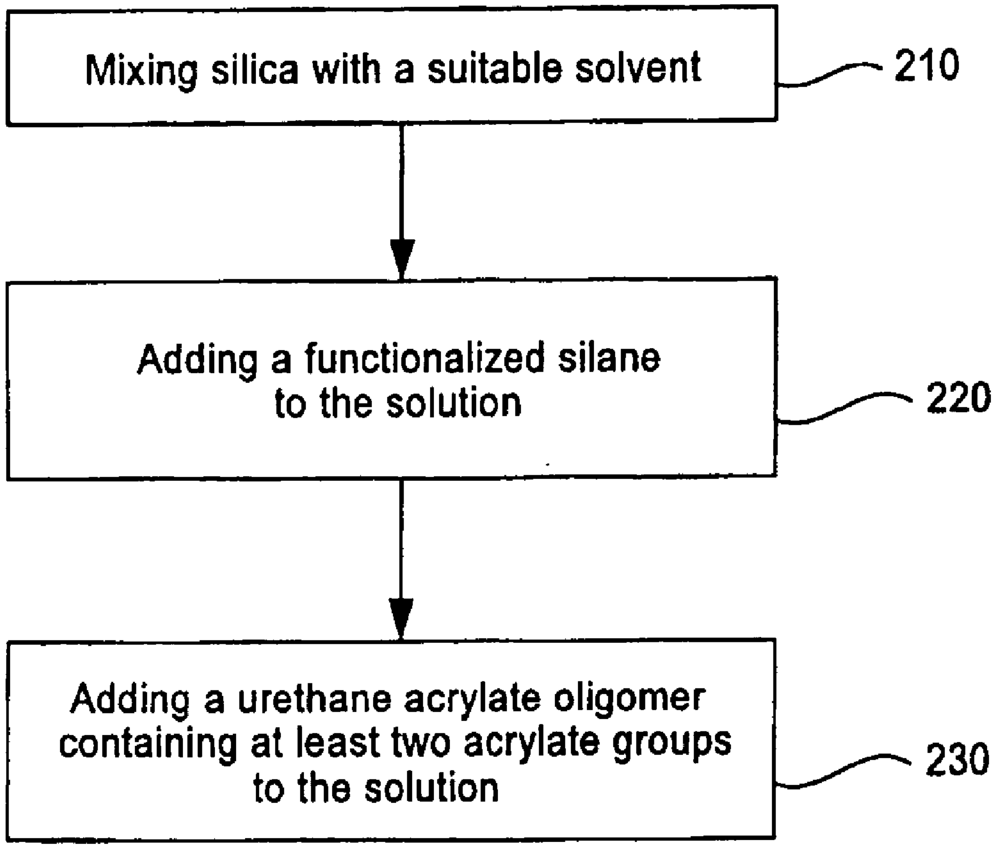
FIG. 2 shows a flow chart that illustrates a method of preparing a composition in accordance with an embodiment of the invention.

FIG. 2 shows a method of preparing a composition in accordance with an embodiment. A first step 210 involves mixing silica with a solvent. In an embodiment, a colloidal silica such as Snowtex O (Nissan Chemicals is utilized and examples of a suitable solvent include ethanol or isopropanol.

A second step 220 involves adding a functionalized silane to the solution. Examples of suitable functionalized silianes include 3-methacryloxypropyl trimethoxysilane or 3-acryloxypropyl trimethoxysilane. Here, the functionalized silane is added over a period of time that is sufficiently long to prevent formation of cloudiness. Usually, the addition of the functionalized silane is carried out dropwise over a period of 10 to 20 minutes. The solution is then allowed to react for an appropriate period of time (generally several hours, for example about 1.5 or 2 hours to about 4 hours).

A final step 230 includes adding a urethane acrylate oligomer containing at least two acrylate groups to the solution. In an embodiment, the urethane acrylate oligomer is a polyurethane acrylate oligomer such as Sartomer CN981, and is added in conjunction with a photoinitiator after the formation of the siloxane oligomers. The solution is then stirred to dissolve the added elements.

The time of addition of the hydrophobic agent depends on the nature of this additive. Silane compounds with hydrophobic groups, such as octyl trimethoxysilane, propyl trimethoxysilane or phenyl trimethoxysilane are added after the addition of the functionalized silane and allowing the original functionalized silane mixture to hydrolyse, but before addition of the polyurethane acrylate oligomer. Alternatively, acrylated polydimethylsiloxane oligomers (Tegomer V-Si 2250, Tego Chemie, Essen, Germany or Addid 320, Wacker Chemie, Burghausen, Germany) are added to the solution after addition of the polyurethane acrylate oligomer. Fluorinated acrylate oligomers can also be effectively added at this stage.

If an adhesion improving agent such as a mercapto functionalized alkoxysilane (e.g., 3-mercaptopropyl trimethoxysilane) or 3-glycidoxypropyl trimethoxysilane is used in an embodiment of the coating composition, it is usually added to the reaction medium together with the functionalised silane.

Figure 3:
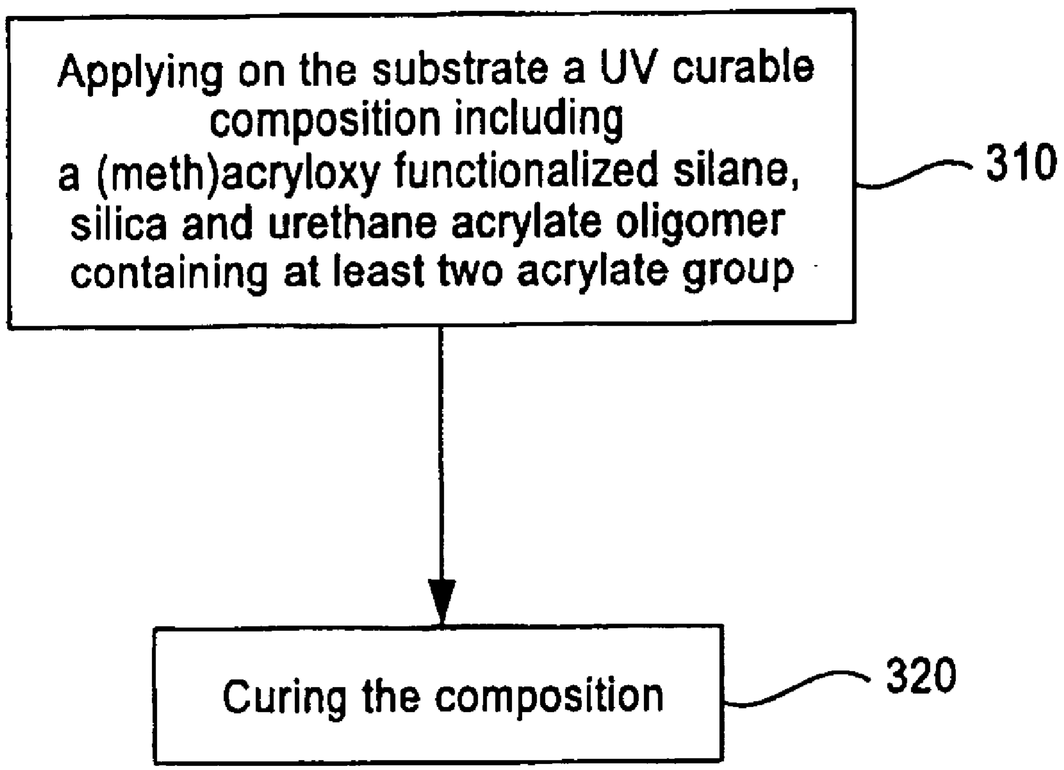
FIG. 3 shows a flow chart that illustrates a method of coating a selected surface with a composition in accordance with an embodiment of the invention.

An alternate embodiment is also contemplated whereby the so-obtained curable composition is applied on a selected surface. FIG. 3 shows a flowchart of a method of coating a selected surface. A first step 310 involves applying on a surface a UV curable composition containing a (meth) acryloxy functionalized silane, silica and a urethane acrylate oligomer containing at least two acrylate groups. In an embodiment, the surface is a substrate. A final step 320 involves curing the applied composition.

Dip coating, micro-spray and spin coating methods may be employed. Printing is also possible if the properties of the formulation are modified by addition of rheology modifiers. Suitable rheology modifiers are fumed silica, for example the Aerosil series of products from Degussa, Germany. Spray coating and printing may provide advantages in some cases since they allow the coating composition (coating layer) to be applied selectively on specific areas of the surface where control of the wetting properties may be critical.

Coating thicknesses in the region of 1 to 5 microns are generally employed, though both thicker and thinner layers can be produced by adjustment of the coating solution properties or the parameters of the deposition technique.

After application, the coatings are cured using a dual cure process. Coatings are first UV cured in order to convert the surface to a tack free state. This is followed by a thermal consolidation step at a sufficiently high temperature (for example about 150° C.) for a sufficiently long period of time, usually up to one hour. UV irradiation causes cross-linking of the vinyl, acrylate and methacrylate groups within the coating, while thermal treatment accelerates formation of the sol-gel silicate matrix.

The coating composition in accordance with varying embodiments shows good adhesion to a great variety of surfaces, allowing the coating to be effectively employed on a plurality of substrates. The substrate may include any material that is selected from the group that includes silicon, metal, glass and polymeric material. If a polymeric material is to be coated, this polymeric material may include polyimide, polycarbonate, poly(methyl)acrylate, acrylonitrile-butadiene-styrene (ABS), epoxide based polymers and combinations thereof. Metals that can be coated with the composition include gold, silver, palladium, iridium, platinum (i.e. the noble metals), copper, iron as well as alloys and any combination of such metals.

Figure 4:
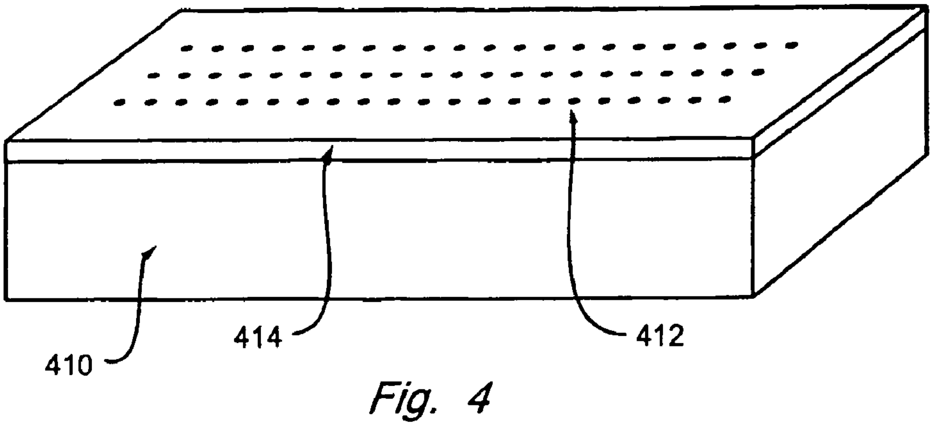
FIG. 4 shows an orifice plate of an ink jet print head coated with a hydrophobic coating layer obtained from a curable hydrophobic coating composition in accordance with an embodiment of the invention.

As can be seen from the above list of suitable materials, the coating can be applied on virtually every material that is used to manufacture the orifice plates of ink jet printers. Therefore, in one embodiment the substrate to be coated is an orifice plate of an ink jet print head. In this embodiment it is not necessary to coat the entire surface of the orifice plate, but it is sufficient to coat only the areas surrounding the nozzles. This embodiment is also exemplified in FIG. 4, which shows an orifice plate 410 of an ink jet print head (not shown) having several rows of nozzles 412. The orifice plate 410 is coated with a hydrophobic coating layer 414 obtained from an embodiment of the coating composition.

As will also be seen from the following examples, coatings fabricated in accordance with the described embodiments withstand up to 70 days exposure to ink at 60° C., showing little evidence of degradation of the contact angle or adhesion and thus making them very promising for use in large scale manufacture of ink jet print heads.

EXAMPLE 1

Snowtex O (9.0 g) was mixed with ethanol (11.0 g) in a glass beaker. To this mixture was added 3-methacryloxypropyl trimethoxysilane (19.8 g) and 3-mercaptopropyl trimethoxysilane (0.8 g) dropwise with stirring. After allowing the hydrolysis and condensation reactions to proceed for 2 hours, Sartomer CN981 (3.4 g) was added and the solution was stirred until homogeneous. Tegomer V-Si2250 (3.4 g) was then added and again the solution was stirred to until the oligomer was uniformly dispersed. In the final step, Darocur 1173 photoinitiator (2 g) was added.

Using a dip coating process, with a sample retraction rate of 2 mm $sec^{-1}$, the coating solution was applied to surfaces of materials used commonly as top plate materials for print heads, such as polyimide (Kapton™ E film from DuPont), Pd, and a photoimageable epoxy as well as uncoated glass microscope slides. Samples were UV cured by passage through a Technigraf GmbH, (Grävenwiesbach, Germany)

belt oven (80 W/cm, 3 m/min). The coating process was completed by heating samples at 150° C. for one hour. The thickness of the coating is measured to be around 6 μm.

Water contact angle measurements were performed using a Surface Contact Angle Goniometer (Rame-Hart, Inc, Moutain Lake, N.J., Model No: 100-00-115). After sample preparation, water contact angle measurements were made prior to any other testing of the materials. Compared with uncoated surfaces, the coating showed much higher contact angles measured with deionized water and inks commercially available from Hewlett Packard (as shown in Table 1), suggesting that a much more hydrophobic (water and ink repelling) surface was derived.

TABLE 1

Contact angles measured on different surfaces with deionized water and ink

| | contact angle(°) | | |
|---|---|---|---|
| samples (substrate) | $H_2O$ | HP 51645a black ink | HP cyan ink 2 |
| Coating from Example 1 on Glass slides | 90 | 64 | 45 |
| Kapton | 60 | 56 | |
| Palladium | 63 | 52 | |
| photoimageable epoxy | 36 | | 15 |

Figure 5:
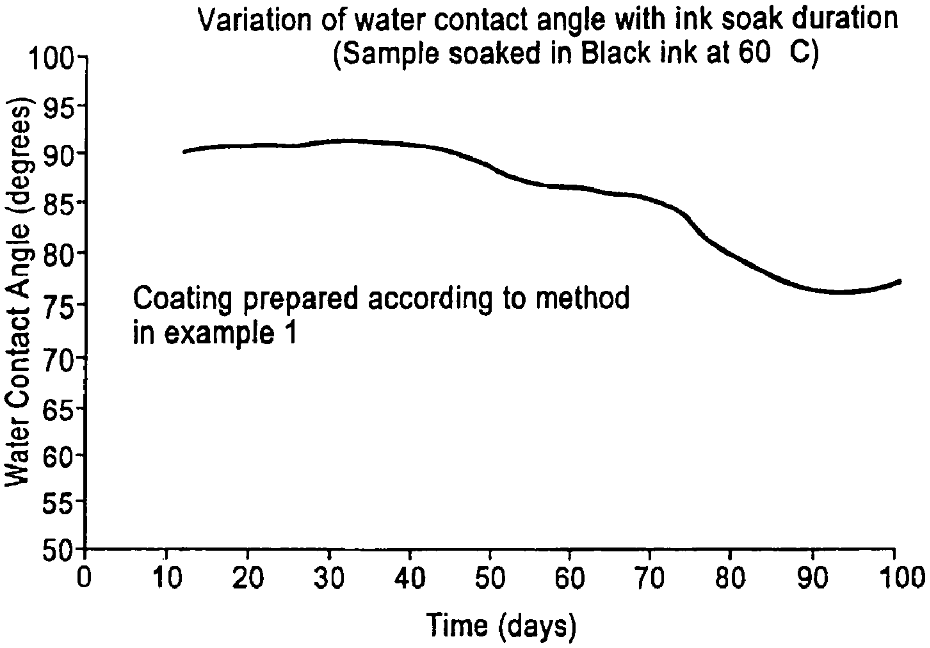
FIG. 5 shows the variation of water contact angle of a polyimide substrate coated with a coating composition in accordance with an embodiment of the invention.

The samples of the used photoimageable epoxy and the glass slides were further examined with respect to the long term properties of the obtained coating. For this purpose, the photoimageable epoxy substrate and the glass slides, respectively, coated with this coating were stored in a sealed container filled with HP 51645a black ink at 60° C. At six day intervals, samples were removed from the ink, washed with deionized water and blotted dry. Contact angle data for the photoimageable epoxy substrate, measured with deionized water, as a function of immersion time in the ink are plotted in FIG. 5. As can be seen from FIG. 5, little change in the water contact angle was observed after 70 days immersion in the ink. Thus, coatings showing high water contact, and ink contact angles are produced. These coatings are resistant to degradation by ink, maintaining high contact angles, adhesion to the substrate and mechanical integrity even after long term exposure to inks at elevated temperatures (60° C.) for up to 70 days.

Further samples were rubbed using wiper blade material (used on Hewlett Packet printers) 100 times manually after each ink exposure period. The rubbed samples showed no evidence of mechanical damage, nor of any decrease in the water contact angle.

The results of the long-term ageing test using the coated glass slides (duration 78 days) are shown in Table 4 below.

EXAMPLE 2

Figure 6:
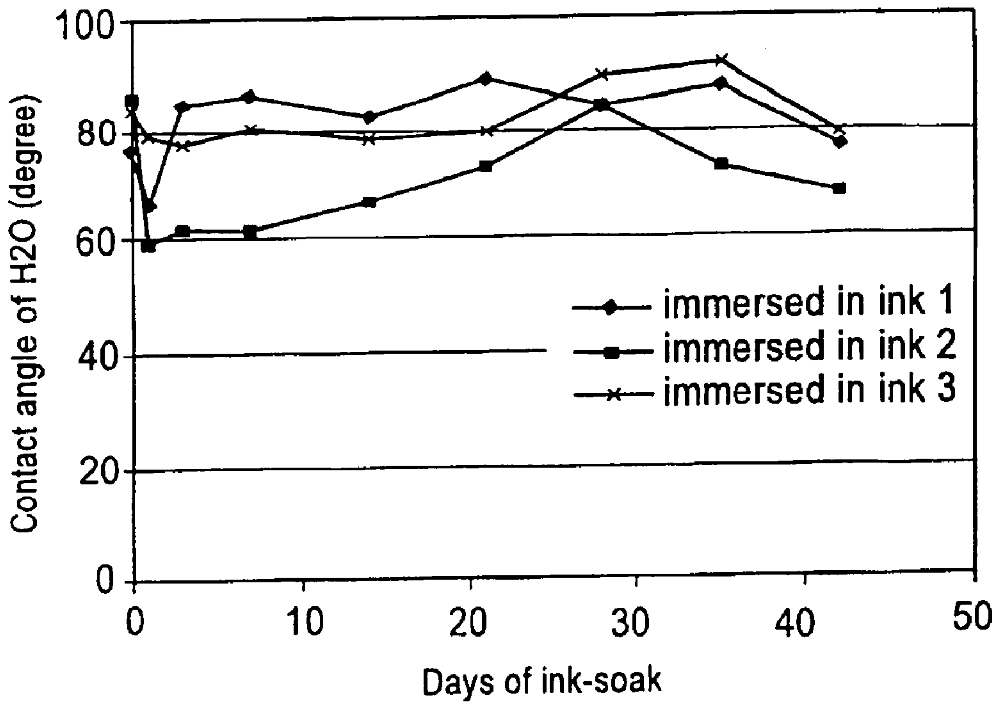
FIG. 6 shows changes of contact angle of deionised water on the surface of a coating in accordance with an embodiment of the invention applied on a photoimageable epoxy substrate which had been soaked in one of three different inks with soaking time at 70° C.
Figure 7:
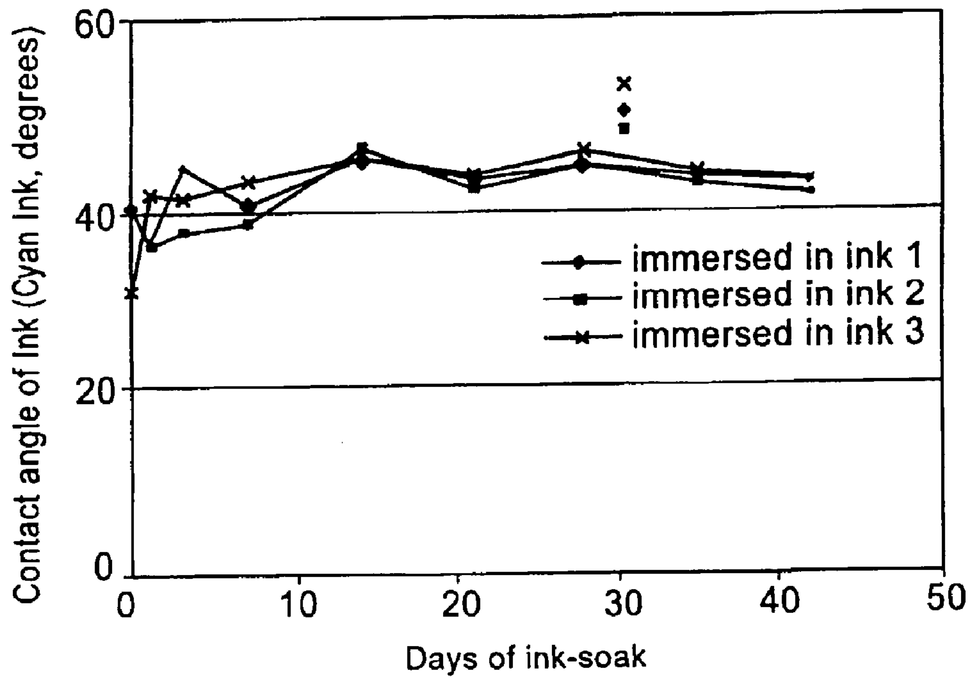
FIG. 7 shows changes of contact angle of the cyan ink 2 on a coating in accordance with an embodiment of the invention applied on a photoimageable epoxy substrate which had been soaked in ink 1, 2 and 3, respectively with soaking time at 70° C.

In another example, the same composition as prepared in Example 1 was coated on top of a photoimageable epoxy substrate. After curing at 150° C. for one hour, samples were soaked in three different Hewlett Packard inks at 70° C. (in FIGS. 6 and 7, ink 1 and ink 2 are both cyan inks developed by Hewlett Packard and ink 3 is a colourless ink also developed by Hewlett Packard). Ink soaking at elevated temperatures is a well accepted method to study reliability and material's compatibility. Samples were removed from the ink every week and contact angles with both deionized water (FIG. 6) and ink 2 (FIG. 7) were measured, to study the degradation behaviour of the coating's surface properties and the interfacial adhesion between the coating and the photoimageable epoxy substrate. FIG. 6 and FIG. 7 show the changes of both water contact angle and ink contact angle, respectively, as a function of soaking time. The results of the contact angle measurement over the period of time after immersion in cyan ink 1 are represented in FIGS. 6 and 7 by rhombi, whereas the experiments with cyan ink 2 and the colourless ink 3 are depicted using squares and crosses, respectively.

It was found that the surface hydrophobicity of the coating did not change much with ink soaking up to 6 weeks. No delamination (separation between the coating and the photoimageable epoxy substrate) was observed through the whole range of ink soaking. Accordingly, this coating with enhanced hydrophobicity has good reliability and interfacial adhesion with essentially all of the materials used for manufacturing orifice plates in ink jet print heads. Thus, the coating provides desirable surface characteristics.

EXAMPLE 3

The coating solution was prepared as per Example 1 except that propyl trimethoxysilane (4.8 g) was added to the formulation in place of 3-mercaptopropyl trimethoxysilane, and no Tegomer V-Si2250 was included. Using the resulting coating solution, glass microscope slides were coated, wherein coatings were prepared and tested as described in Example 1 meaning the initial water contact angle of the coated substrates was measured using a Surface Contact Angle Goniometer (Rame-Hart, Inc, Model No: 100-00-115) as described in Example 1. Furthermore, the coated substrate were stored in a sealed container filled with HP 51645a black ink at 60° C. and tested as described in Example 1 (cf. Tables 2 and 3) for long term behaviour with the exception that the test in Example 3 was carried out for 42 days. The results of this long-term ageing test are shown in Table 4.

EXAMPLE 4

The coating solution and samples (coated glass microscope slides) were prepared as described for Example 3, except that octyl trimethoxysilane (7.7 g) was added to the coating solution instead of propyl trimethoxysilane. Using the resulting coating solution, glass microscope slides were coated, wherein coatings were prepared and tested in a long term ageing test as described in Example 3.

EXAMPLE 5

The coating solution and samples (coated glass microscope slides) were prepared as described for Example 3, except that phenyl trimethoxysilane (5.7 g) was added to the coating solution instead of propyl trimethoxysilane. Using the resulting coating solution, glass microscope slides were coated, wherein coatings were prepared and tested in a long term ageing test as described in Example 3.

EXAMPLE 6 (COMPARATIVE EXAMPLE)

Snowtex O (9.0 g) was mixed with ethanol (11.0 g) in a glass beaker. To this mixture was added 3-methacryloxypropyl trimethoxysilane (19.8 g) dropwise with stirring. After allowing the hydrolysis and condensation reactions to proceed for 2 hours, Addid 320 (Wacker Chemie) (3.4 g) was added and the solution was stirred until homogeneous. In the final step, Darocur 1173 photoinitiator (2 g) was added. Using the resulting coating solution, coatings were prepared and tested as described in Example 1.

EXAMPLE 7 (COMPARATIVE EXAMPLE)

Snowtex O (9.0 g) was mixed with ethanol (11.0 g) in a glass beaker. To this mixture was added 3-methacryloxypropyl trimethoxysilane (19.8 g) and octyl trimethoxysilane (7.7 g) dropwise with stirring. After allowing the hydrolysis and condensation reactions to proceed for 2 hours, Addid 320 (Wacker Chemie) (3.4 g), was added and the solution was stirred until homogeneous. In the final step, Darocur 1173 photoinitiator (2 g) was added. Using the resulting coating solution, coatings were prepared and tested as described in Example 1.

EXAMPLE 8

Snowtex O (9.0 g) was mixed with ethanol (11.0 g) in a glass beaker. To this mixture was added 3-methacryloxypropyl trimethoxysilane (19.8 g) dropwise with stirring. After allowing the hydrolysis and condensation reactions to proceed for 2 hours, Addid 320 (Wacker Chemie) (3.4 g) and Sartomer CN981 (3.4 g) were added and the solution was stirred until homogeneous. In the final step, Darocur 1173 photoinitiator (2 g) was added. Using the resulting coating solution, coatings were prepared and tested as described in Example 1.

TABLE 2

Initial water contact angles

| Sample ID (on glass) | Water contact angle (°) | Contact angle of HP 51645a black ink (°) |
|---|---|---|
| Example 1 | 85 | 64 |
| Example 6 | 87 | 76 |
| Example 7 | 87 | 72 |
| Example 8 | 87 | 78 |

TABLE 3

Variation of water contact angle with ageing time in ink

| | Water contact angle (°) | | | |
|---|---|---|---|---|
| Sample ID | 0 days | 6 days | 12 days | 18 days |
| Example 6 | 87 | 71 | 68 | Peeling |
| Example 7 | 87 | 90 | 87 | Peeling |
| Example 8 | 87 | 86 | 80 | 78 |

TABLE 4

Variation of water contact angle with ageing time in ink

| | Water contact angle (°) | | | | | | | |
|---|---|---|---|---|---|---|---|---|
| Sample ID | 0 days | 6 days | 12 days | 18 days | 24 days | 30 days | 36 days | 42 days |
| Example 1 | 92 | 91 | 90 | 91 | 90 | 92 | 90 | 91 |
| Example 3 | 76 | 73 | 70 | 71 | 67 | 69 | 65 | 59 |
| Example 4 | 86 | 85 | 88 | 86 | 86 | 82 | 78 | 78 |
| Example 5 | 72 | 67 | 64 | 62 | 62 | 62 | 64 | 62 |

| | Water contact angle (°) | | | | | |
|---|---|---|---|---|---|---|
| Sample ID | 48 days | 54 days | 60 days | 66 days | 72 days | 78 days |
| Example 1 | 87 | 87 | 83 | 80 | 77 | 76 |

As can be seen from Table 2, contact angles of almost 90° for deionized water and HP 51645a black ink in the range of about 64° to about 80° were obtained, when using a glass substrate coated with the an embodiment of the composition. Notably, the ink contact angles for compositions that are fabricated according Example 8 are higher than for those compositions of the Comparative Examples 6 and 7 that do not contain a polyurethane acrylate oligomer. Table 3 further shows that the coating composition used in Example 8 also yields a coating that retains a good contact angle as well as mechanical stability over an extended period of time, whereas the compositions of Comparative Examples 6 and 7 cracked and peeled after 18 days ink soak. As shown in Table 4, the same applies for the coatings of Examples 1 and 3 to 5. Also these results indicate that a strongly hydrophobic (water and ink repelling) surface having good long term stability was derived by means of the coating composition.

The various modifications and alterations of this invention will be apparent to those skilled in the art without departing from the scope and spirit of this invention. The invention should not be restricted to that set forth herein for illustrative purposes.

What is claimed is:

1. A UV curable coating composition comprising:

a (meth)acryloxy- or vinyl functionalized silane present in an amount of 25% to 50% by weight based on the total weight of the composition;

silica present in an amount of 10% to 25% by weight based on the total weight of the composition;

polyurethane acrylate oligomer containing at least two acrylate groups present in an amount of 4% to 15% by weight based on the total weight of the composition; and a solvent present in an amount of 20 to 40% by weight based on the total weight of the composition.

2. The composition of claim 1, wherein the (meth)acryloxy- or vinyl functionalized silane has a formula $$X_aSiY_b,R^X_{(4-a-)} \quad (I),$$

wherein in formula (I)

X denotes a hydrolysable group,

Y denotes a substituent that carries a vinyl, methacryloxy or acryloxy functionality;

$R^x$ is alkyl, aryl, alkenyl, alkylaryl or arylalkyl, a=1 to 3;

b=1 or 2.

3. The composition of claim 2, wherein the (meth)acryloxy functionalized silane has a chemical formula (II)

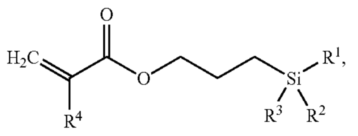

wherein in formula (II) $R^1$, $R^2$, and $R^3$ are independently from each other O-alkyl, O-aryl, O-arylalkyl, or halogen and $R^4$ is hydrogen or methyl.

4. The composition of claim 2, wherein the vinyl functionalized silane has the chemical formula (III)

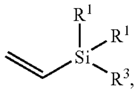

wherein in formula (III) $R^1$, $R^2$, and $R^3$ are independently from each other O-alkyl, O-aryl, O-arylalkyl, or halide.

5. The composition of claim 1, wherein the silica is selected from the group consisting of colloidal silica and fumed silica.

6. The composition of claim 5, wherein the colloidal silica has a particle size ranging from about 5 to about 100 nanometers.

7. The composition of claim 1, wherein the polyurethane acrylate oligomer is selected from the group consisting of aliphatic and aromatic urethane acrylate.

8. The composition of claim 1, wherein the polyurethane acrylate oligomer comprises a backbone selected from the group consisting of a polyester backbone, polyether backbone or a combination thereof.

9. The composition of claim 1, wherein the polyurethane acrylate oligomer has a molecular weight ranging from about 1000 to about 6000 Dalton.

10. The composition of claim 1, further comprising a hydrophobic agent present in an amount of 4% to 20% by weight based on the total weight of the composition.

11. The composition of claim 10, wherein the hydrophobic agent is selected from the group consisting of acrylated polydimethylsiloxane, silane with at least one alkyl chain attached to the silicon atom, perfluoralkyl alkoxysilane, perfluorinated acrylate oligomers, perfluorinated acrylate monomer and combinations thereof.

12. The composition of claim 11, wherein the hydrophobic agent is acrylated polydimethylsiloxane having a linear chain between about 10 and about 30 dimethylsiloxane units with acrylate groups at either end.

13. The composition of claim 11, wherein the hydrophobic agent is perfluoroalkyl alkoxysilane having the formula $CF_3(CF_2)_m(CH_2)_nSi(OR)_3$, where n is an integer between 1 and 4 and m is an integer between 1 and 12.

14. The composition of claim 11, wherein the hydrophobic agent is silane with at least one alkyl chain attached to the silicon atom and has the formula RSiOR'OR"OR'", wherein R is alkyl, alkylaryl, aryl, arylalkyl having 2 to 20 carbon atoms, and R', R", and R'" are independently from each alkyl, alkylaryl, aryl, arylalkyl having 1 to 20 carbon atoms.

15. The composition of claim 11, wherein the hydrophobic agent is perfluorinated acrylate monomer, which is selected from the group consisting of 2,2,2-trifluoroethyl acrylate, 2,2,2-trifluoroethyl methacrylate and a mixture thereof.

16. A method for preparing a UV curable coating composition comprising:

mixing silica with a suitable solvent;

adding (meth)acryloxy- or vinyl functionalized silane to this solution; and subsequently adding polyurethane acrylate oligomer containing at least two acrylate groups, whereby the prepared coating composition comprises 25% to 50% by weight (meth)acryloxy- or vinyl functionalized silane, 10% to 25% by weight silica, 4% to 15% by weight polyurethane acrylate oligomer, and 20% to 40% by weight solvent.

* * * * *